US010675686B2

(12) United States Patent
Cui et al.

(10) Patent No.: US 10,675,686 B2
(45) Date of Patent: Jun. 9, 2020

(54) HYBRID COMPONENT WITH MULTIPLE CORES AND METHOD FOR TREATING A COMPONENT

(71) Applicant: GENERAL ELECTRIC COMPANY, Schenectady, NY (US)

(72) Inventors: Yan Cui, Greer, SC (US); Srikanth Chandrudu Kottilingam, Greenville, SC (US); Brian Lee Tollison, Honea Path, SC (US); Timothy Neal Pletcher, Greenwood, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 245 days.

(21) Appl. No.: 15/472,783

(22) Filed: Mar. 29, 2017

(65) Prior Publication Data
US 2018/0281070 A1    Oct. 4, 2018

(51) Int. Cl.
*B22F 1/02*    (2006.01)
*B22F 3/16*    (2006.01)
(Continued)

(52) U.S. Cl.
CPC .............. *B22F 3/16* (2013.01); *B22F 1/0059* (2013.01); *B22F 3/12* (2013.01); *B22F 7/008* (2013.01);
(Continued)

(58) Field of Classification Search
CPC .............. B22F 1/0059; B22F 2007/042; B22F 2007/047; B22F 3/12; B22F 3/16;
(Continued)

(56) References Cited

U.S. PATENT DOCUMENTS

| 3,989,863 A | 11/1976 | Jackson et al. | |
|---|---|---|---|
| 2010/0059573 A1* | 3/2010 | Kottilingam | B23K 1/001 228/164 |
| 2013/0086785 A1* | 4/2013 | Cui | B32B 15/01 29/402.18 |

FOREIGN PATENT DOCUMENTS

| DE | 2 235 277 A1 | 2/1973 |
|---|---|---|
| DE | 103 46 281 A1 | 5/2005 |

OTHER PUBLICATIONS

Extended European Search Report and Opinion issued in connection with corresponding EP Application No. 18162546.8 dated Aug. 17, 2018.

* cited by examiner

*Primary Examiner* — Alexander M Weddle
(74) *Attorney, Agent, or Firm* — McNees Wallace & Nurick LLC

(57) ABSTRACT

A hybrid preform component including a plurality of elongated metallic cores and a coating paste is provided. The coating paste envelops the plurality of elongated metallic cores. The coating paste includes a first material having a first melting point, a second material having a second melting point, and a binder. A method for treating a component is also provided. The method includes the step of mixing a second material, a first material, and a binder to make coating paste. The method further includes the step of coating the plurality of cores using the coating paste to form a coated rod assembly. The method further includes the step of compressing the coated rod assembly to envelop the coating paste to the plurality of cores and form a preform component having a near net shape. The method further includes the step of sintering the preform component to form a pre-sintered preform.

20 Claims, 4 Drawing Sheets

(51) Int. Cl.
  *B22F 1/00* (2006.01)
  *B23K 35/02* (2006.01)
  *C22C 19/05* (2006.01)
  *B23K 35/40* (2006.01)
  *B23K 35/30* (2006.01)
  *C22C 19/07* (2006.01)
  *B22F 3/12* (2006.01)
  *B22F 7/06* (2006.01)
  *C22C 19/00* (2006.01)
  *B32B 15/01* (2006.01)
  *B22F 7/00* (2006.01)
  *B22F 9/04* (2006.01)
  *B23K 1/00* (2006.01)
  *B23K 31/02* (2006.01)
  *B22F 5/04* (2006.01)
  *B22F 5/00* (2006.01)
  *B22F 7/04* (2006.01)
  *B23K 101/34* (2006.01)

(52) U.S. Cl.
  CPC ............... *B22F 7/062* (2013.01); *B22F 9/04* (2013.01); *B23K 1/0008* (2013.01); *B23K 31/02* (2013.01); *B23K 35/025* (2013.01); *B23K 35/0272* (2013.01); *B23K 35/0277* (2013.01); *B23K 35/0283* (2013.01); *B23K 35/3033* (2013.01); *B23K 35/3046* (2013.01); *B23K 35/404* (2013.01); *B32B 15/01* (2013.01); *C22C 19/007* (2013.01); *C22C 19/05* (2013.01); *C22C 19/055* (2013.01); *C22C 19/056* (2013.01); *C22C 19/07* (2013.01); *B22F 5/009* (2013.01); *B22F 5/04* (2013.01); *B22F 2007/042* (2013.01); *B22F 2007/047* (2013.01); *B23K 2101/34* (2018.08)

(58) Field of Classification Search
  CPC .. B22F 5/009; B22F 5/04; B22F 7/008; B22F 7/062; B22F 9/04; B23K 1/008; B23K 2101/34; B23K 31/02; B23K 35/025; B23K 35/0272; B23K 35/0277; B23K 35/0283; B23K 35/3033; B23K 35/3046; B23K 35/404; B32B 15/01; C22C 19/007; C22C 19/05; C22C 19/055; C22C 19/056; C22C 19/07
  See application file for complete search history.

HYBRID COMPONENT WITH MULTIPLE CORES AND METHOD FOR TREATING A COMPONENT

FIELD OF THE INVENTION

The present invention is generally directed to a hybrid component and a method for treating a component using the hybrid component. More specifically, the present invention is directed to a hybrid component with multiple cores and a method for treating a component using the hybrid component.

BACKGROUND OF THE INVENTION

Hard-to-weld (HTW) alloys, such as nickel-based superalloys and certain aluminum-titanium alloys, due to their gamma prime and various geometric constraints, are susceptible to gamma prime strain aging, liquation and hot cracking. These materials are also difficult to join when the gamma prime phase is present in volume fractions greater than about 30%, which may occur when aluminum or titanium content exceeds about 3%. As used herein, an "HTW alloy" is an alloy which exhibits liquation, hot and strain-age cracking, and which is therefore impractical to weld.

These HTW alloys may be incorporated into components of gas turbine engines such as airfoils, blades (buckets), nozzles (vanes), shrouds, combustors, rotating turbine components, wheels, seals, 3d-manufactured components with HTW alloys and other hot gas path components. Incorporation of these HTW alloys may be desirable due to often superior operational properties, particularly for certain components subjected to the most extreme conditions and stresses.

Manufacturing processes and repairs of components incorporating HTW alloys, such as the closing of apertures left open during casting processes, is difficult to achieve using standard techniques, as these techniques may damage the HTW alloys or introduce materials which would be weakened or cracked by the elevated temperatures to which the components are subjected to. By way of example, typical brazing techniques are unsuitable because typical braze materials or elements are incorporated into the component which may not meet operational requirements.

BRIEF SUMMARY OF THE INVENTION

In an exemplary embodiment, a hybrid preform component is provided. The hybrid preform component includes a plurality of elongated metallic cores and a coating paste. The coating paste envelops the plurality of elongated metallic cores. The coating paste includes a first material having a first melting point, a second material having a second melting point, and a binder, wherein the first melting point is higher than the second melting point. The hybrid preform component has a compressed structure and near net shape.

In another exemplary embodiment, a method for treating a component is provided. The method includes the step of mixing a first material having a first melting point, a second material having a second melting point, and a binder to make coating paste, wherein the first melting point is higher than the second melting point. The method further includes the step of coating the plurality of cores using the coating paste to form a coated rod assembly. The method further includes the step of compressing the coated rod assembly to envelop the coating paste to the plurality of cores and form a preform component having a near net shape. The method further includes the step of sintering the preform component to form a pre-sintered preform.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
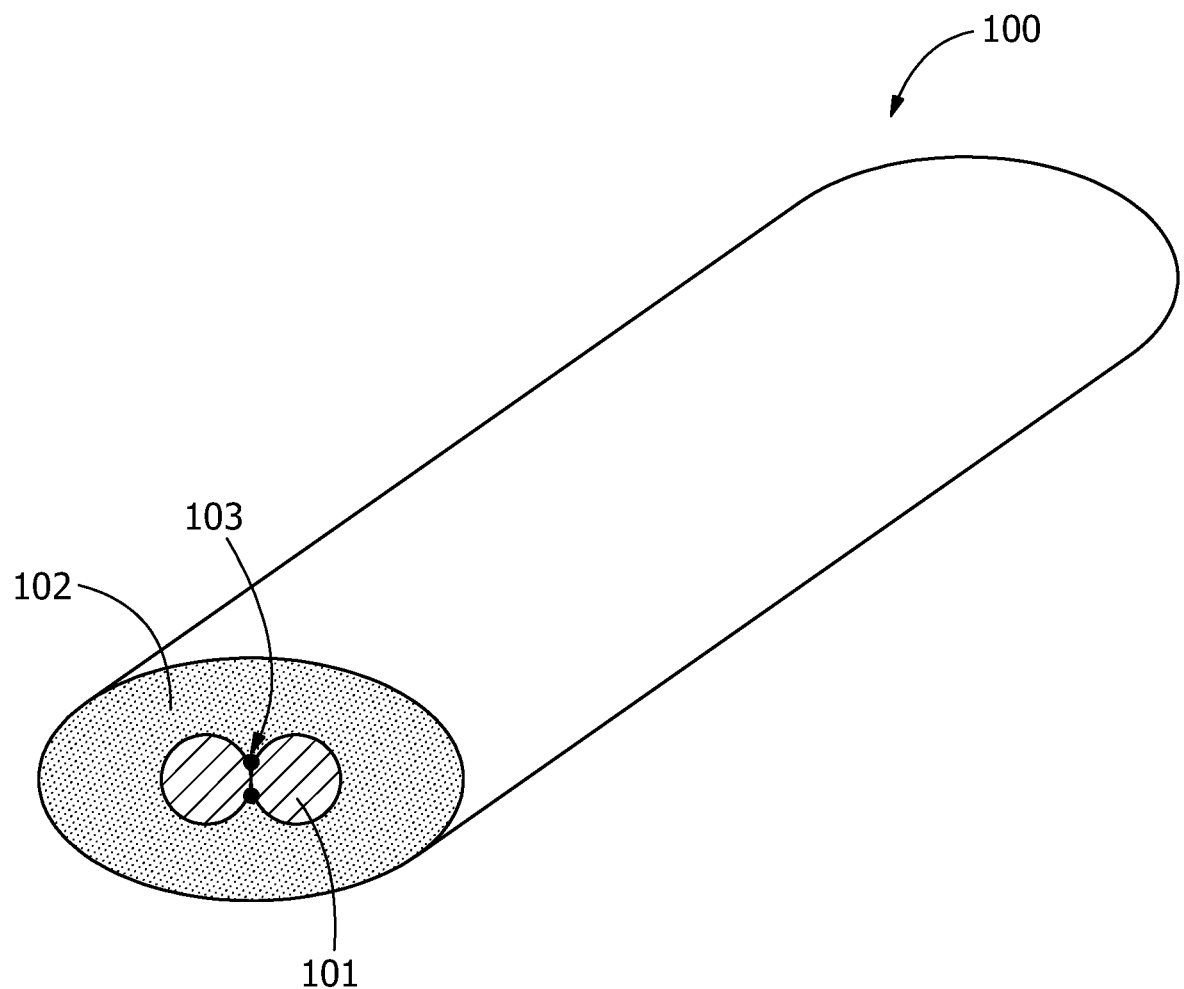
FIG. 1 shows perspective view of a hybrid preform component, according to an embodiment of the present disclosure.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Provided are exemplary methods and components for treating components. Embodiments of the present disclosure, in comparison to methods and articles not utilizing one or more features disclosed herein, enable closing large openings of components of gas turbine engines without shrinkage and melting at a lower coast.

All numbers expressing quantities of ingredients and/or reaction conditions are to be understood as being modified in all instances by the term "about", unless otherwise indicated.

All percentages and ratios are calculated by weight unless otherwise indicated. All percentages are calculated based on the total weight of a composition unless otherwise indicated. All component or composition levels are in reference to the active level of that component or composition, and are exclusive of impurities, for example, residual solvents or by-products, which may be present in commercially available sources.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The term "comprising" (and its grammatical variations), as used herein, is used in the inclusive sense of "having" or "including" and not in the exclusive sense of "consisting only of."

As used herein, "GTD 111" refers to an alloy including a composition, by weight, of about 14% chromium, about 9.5% cobalt, about 3.8% tungsten, about 4.9% titanium, about 3% aluminum, about 0.1% iron, about 2.8% tantalum, about 1.6% molybdenum, about 0.1% carbon, and a balance of nickel.

As used herein, "GTD 444" refers to an alloy including a composition, by weight, of about 7.5% cobalt, about 0.2% iron, about 9.75% chromium, about 4.2% aluminum, about 3.5% titanium, about 4.8% tantalum, about 6% tungsten, about 1.5% molybdenum, about 0.5% niobium, about 0.2% silicon, about 0.15% hafnium, and a balance of nickel.

As used herein, "HAYNES 188" refers to an alloy including a composition, by weight, of about 22% chromium, about 22% nickel, about 0.1% carbon, about 3% iron, about 1.25% manganese, about 0.35% silicon, about 14% tungsten, about 0.03% lanthanum, and a balance of cobalt.

As used herein, "INCONEL 738" refers to an alloy including a composition, by weight, of about 0.17% carbon, about 16% chromium, about 8.5% cobalt, about 1.75% molybdenum, about 2.6% tungsten, about 3.4% titanium, about 3.4% aluminum, about 0.1% zirconium, about 2% niobium, and a balance of nickel.

As used herein, "MAR-M-247" refers to an alloy including a composition, by weight, of about 5.5% aluminum, about 0.15% carbon, about 8.25% chromium, about 10% cobalt, about 10% tungsten, about 0.7% molybdenum, about 0.5% iron, about 1% titanium, about 3% tantalum, about 1.5% hafnium, and a balance of nickel.

As used herein, "René 108" refers to an alloy including a composition, by weight, of about 8.4% chromium, about 9.5% cobalt, about 5.5% aluminum, about 0.7% titanium, about 9.5% tungsten, about 0.5% molybdenum, about 3% tantalum, about 1.5% hafnium, and a balance of nickel.

As used herein, "René 142" refers to an alloy including a composition, by weight, of about 6.8% chromium, about 12% cobalt, about 6.1% aluminum, about 4.9% tungsten, about 1.5% molybdenum, about 2.8% rhenium, about 6.4% tantalum, about 1.5% hafnium, and a balance of nickel.

As used herein, "René 195" refers to an alloy including a composition, by weight, of about 7.6% chromium, about 3.1% cobalt, about 7.8% aluminum, about 5.5% tantalum, about 0.1% molybdenum, about 3.9% tungsten, about 1.7% rhenium, about 0.15% hafnium, and a balance of nickel.

As used herein, "René N2" refers to an alloy including a composition, by weight, of about 7.5% cobalt, about 13% chromium, about 6.6% aluminum, about 5% tantalum, about 3.8% tungsten, about 1.6% rhenium, about 0.15% hafnium, and a balance of nickel.

As used herein, "René N4" refers to an alloy including a composition, by weight, of about 9.75% chromium, about 7.5% cobalt, about 4.2% aluminum, about 3.5% titanium, about 1.5% molybdenum, about 6.0% tungsten, about 4.8% tantalum, about 0.5% niobium, about 0.15% hafnium, and a balance of nickel.

As used herein, "René N5" refers to an alloy including a composition, by weight, of about 7.5% cobalt, about 7.0% chromium, about 6.5% tantalum, about 6.2% aluminum, about 5.0% tungsten, about 3.0% rhenium, about 1.5% molybdenum, about 0.15% hafnium, and a balance of nickel.

As used herein, "René N500" refers to an alloy including a composition, by weight, of about 7.5% cobalt, about 0.2% iron, about 6% chromium, about 6.25% aluminum, about 6.5% tantalum, about 6.25% tungsten, about 1.5% molybdenum, about 0.15% hafnium, and a balance of nickel.

As used herein, "BNi-2" refers to an alloy including a composition, by weight, of about 3% iron, about 3.1% boron, about 4.5% silicon, about 7% chromium, and a balance of nickel.

As used herein, "BNi-5" refers to an alloy including a composition, by weight, of about 10% silicon, about 19% chromium, and a balance of nickel.

As used herein, "BNi-9" refers to an alloy including a composition, by weight, of about 15% chromium, about 3% boron, and a balance of nickel.

As used herein, "DF-4B" refers to an alloy including a composition, by weight, of about 14% chromium, about 10% cobalt, about 3.5% aluminum, about 2.5% tantalum, about 2.75% boron, about 0.05% yttrium, and a balance of nickel.

With reference to FIG. 1, in an embodiment, hybrid preform component 100 includes a plurality of elongated metallic cores 101 and coating paste 102. The coating paste 102 envelops the plurality of elongated metallic cores 101.

In one embodiment, a plurality of elongated metallic cores 101 includes an alloy selected from the group consisting of a superalloy, a nickel-based superalloy, a cobalt-based superalloy, an iron-based superalloy, a hard-to-weld (HTW) alloy, a refractory alloy, GTD 111, GTD 444, HAYNES 188, INCONEL 738, MAR-M-247, René 108, René 142, René 195, René N2, René N4, René N5, René N500, and combinations thereof.

In one embodiment, coating paste 102 includes a first material having a first melting point, a second material having a second melting point, and a binder. The first melting point is greater than the second melting point. In one embodiment, the first melting point is greater than the second melting point by at least 5% or at least 10% or at least 20% or at least 30% or at least 40% or at least 50%. In another embodiment, the first material is a high melt material and the second material is a low melt material.

Suitable first materials may include a superalloy, a nickel-based superalloy, a cobalt-based superalloy, an iron-based superalloy, a hard-to-weld (HTW) alloy, a refractory alloy, GTD 111, GTD 444, HAYNES 188, INCONEL 738, MAR-M-247, René 108, René 142, René 195, and René N2, or a combination thereof.

Suitable second materials may include DF-4B, BNi-2, BNi-5 (AMS 4782), BNi-9, or a combination thereof.

In one embodiment, coating paste 102 has a first material in an amount, by weight, from about 35% to about 95%, from about 45% to about 85%, or from about 55% to about 75%, including increments, intervals, and sub-range therein. Coating paste 102 has a second material in an amount, by weight, from about 5% to about 65%, from about 15% to about 55%, or from about 25% to about 45%, including increments, intervals, and sub-range therein.

In one embodiment, a hybrid perform component 100 has a cross sectional ratio of the plurality of elongated metallic cores to the coating paste from about 40% to about 90%, from about 50% to about 80%, from about 60% to about 70%, including increments, intervals, and sub-range therein.

In one embodiment, hybrid preform component 100 has a compressed structure and near net shape. As used herein, the term "compressed structure" refers to a structure that has been exposed to sufficient mechanical force to form a resilient structure capable of being exposure to additional processing. As used herein, the phrase "near net shape" refers to being of a geometry and size requiring little or no machining or processing after additive manufacturing.

With reference to FIGS. 2-22, sectional views of hybrid preform components 100 in multiple embodiments are provided.

Figure 2:
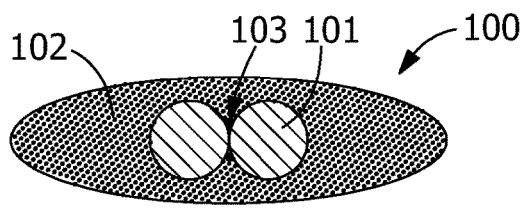
FIGS. 2-22 show sectional views of hybrid preform components, according to embodiments of the present disclosure.
Figure 3:
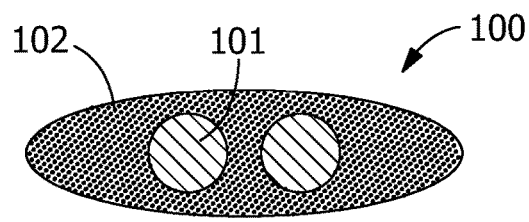
Figure 4:
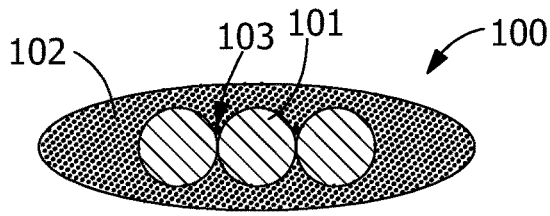
Figure 5:
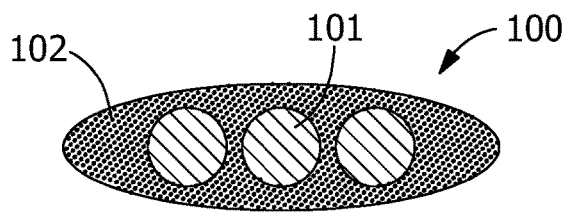
Figure 6:
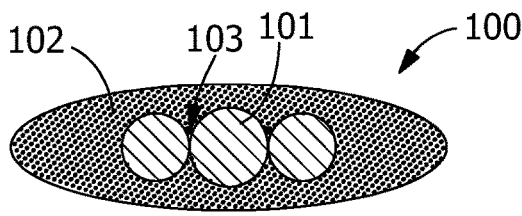
Figure 7:
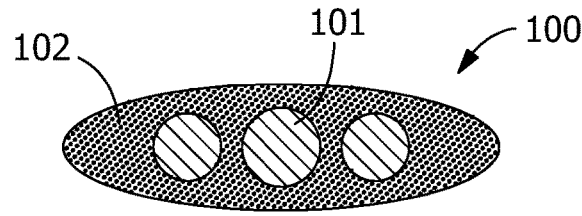
Figure 8:
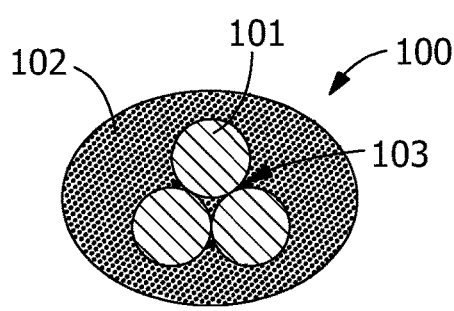
Figure 9:
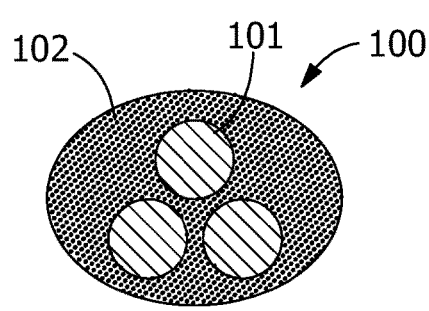
Figure 10:
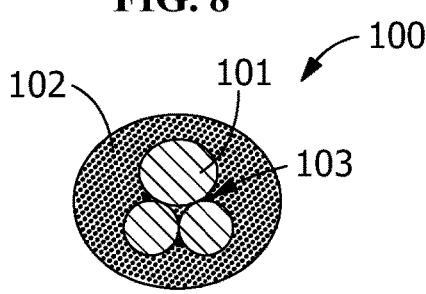
Figure 11:
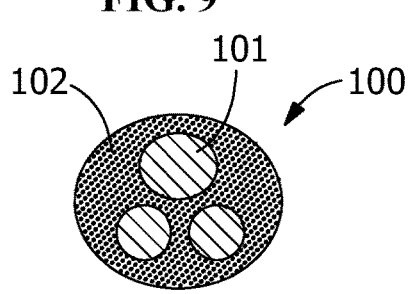
Figure 12:
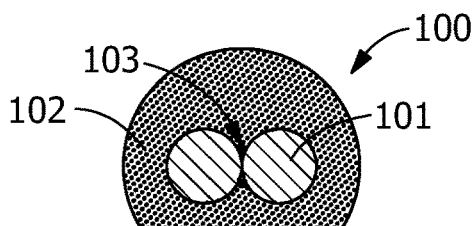
Figure 13:
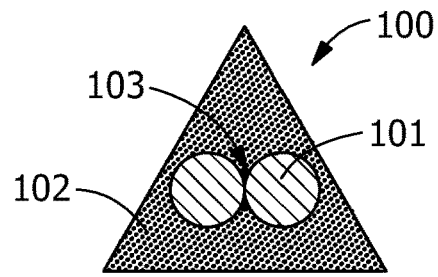
Figure 14:
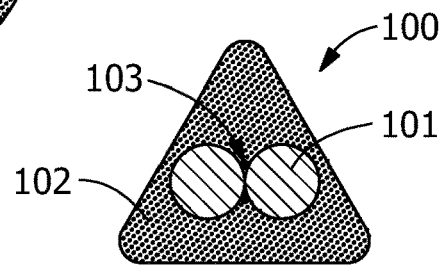
Figure 15:
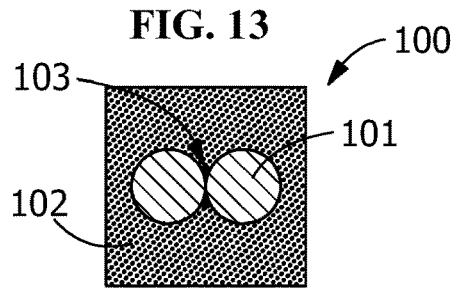
Figure 16:
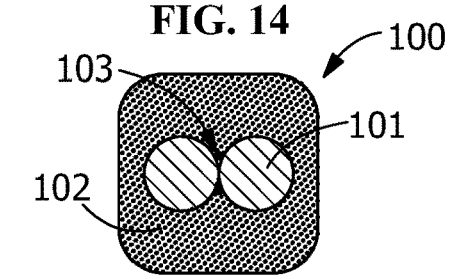
Figure 17:
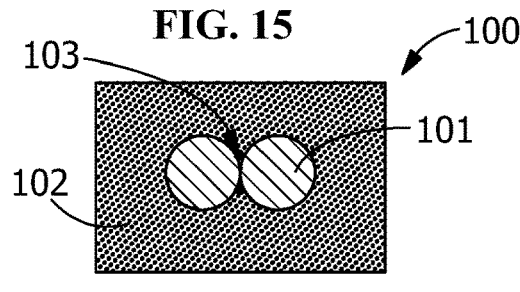
Figure 18:
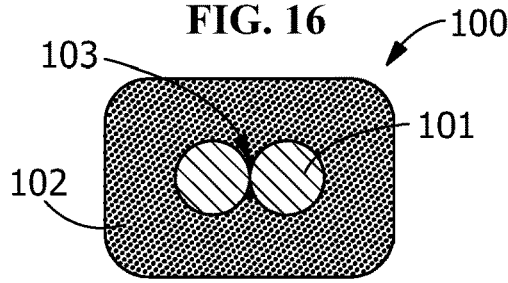
Figure 19:
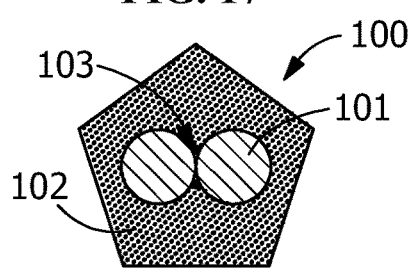
Figure 20:
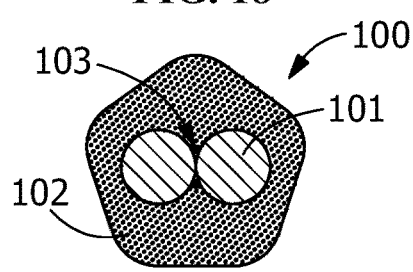
Figure 21:
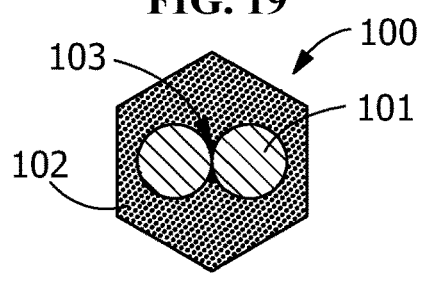
Figure 22:
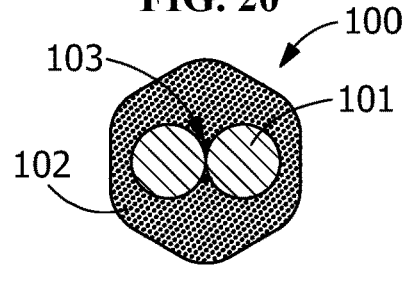

With reference to FIG. 2, hybrid preform component 100 includes two aligned elongated metallic cores 101 having the same diameter and joined together. With reference to FIG. 3, hybrid preform component 100 includes two aligned elongated metallic cores 101 having the same diameter and not joined together. With reference to FIG. 4, hybrid preform component 100 includes three aligned elongated metallic cores 101 having the same diameter and joined together. With reference to FIG. 5, hybrid preform component 100 includes three aligned elongated metallic cores 101 having the same diameter and not joined together. With reference to FIG. 6, hybrid preform component 100 includes three aligned elongated metallic cores 101 having dissimilar diameters and joined together. With reference to FIG. 7, hybrid preform component 100 includes three aligned elongated metallic cores 101 having dissimilar diameters and not joined together. With reference to FIG. 8, hybrid preform component 100 includes three non-aligned elongated metallic cores 101 having the same diameter and joined together. With reference to FIG. 9, hybrid preform component 100 includes three non-aligned elongated metallic cores 101 having the same diameter and not joined together. With reference to FIG. 10, hybrid preform component 100 includes three non-aligned elongated metallic cores 101 having dissimilar diameters and not joined together. With reference to FIG. 11, hybrid preform component 100 includes three non-aligned elongated metallic cores 101 having dissimilar diameters and not joined together. With reference to FIGS. 12-22, a hybrid perform component 100 has a cross-sectional geometry selected from the group consisting of a circle, an ellipse, an oval, a triangle, a rounded triangle, a square, a rounded square, a rectangle, a rounded rectangle, a pentagon, a rounded pentagon, a hexagon, a rounded hexagon, and a combination thereof. A person skilled in the art will appreciate that those hybrid preform components 100 shown in FIGS. 12-22 may have elongated metallic cores with a variety of configurations as shown in FIGS. 2-11. A person skilled in the art will also appreciate that the present invention may include more than three elongated metallic cores with a variety of configurations.

Figure 23:
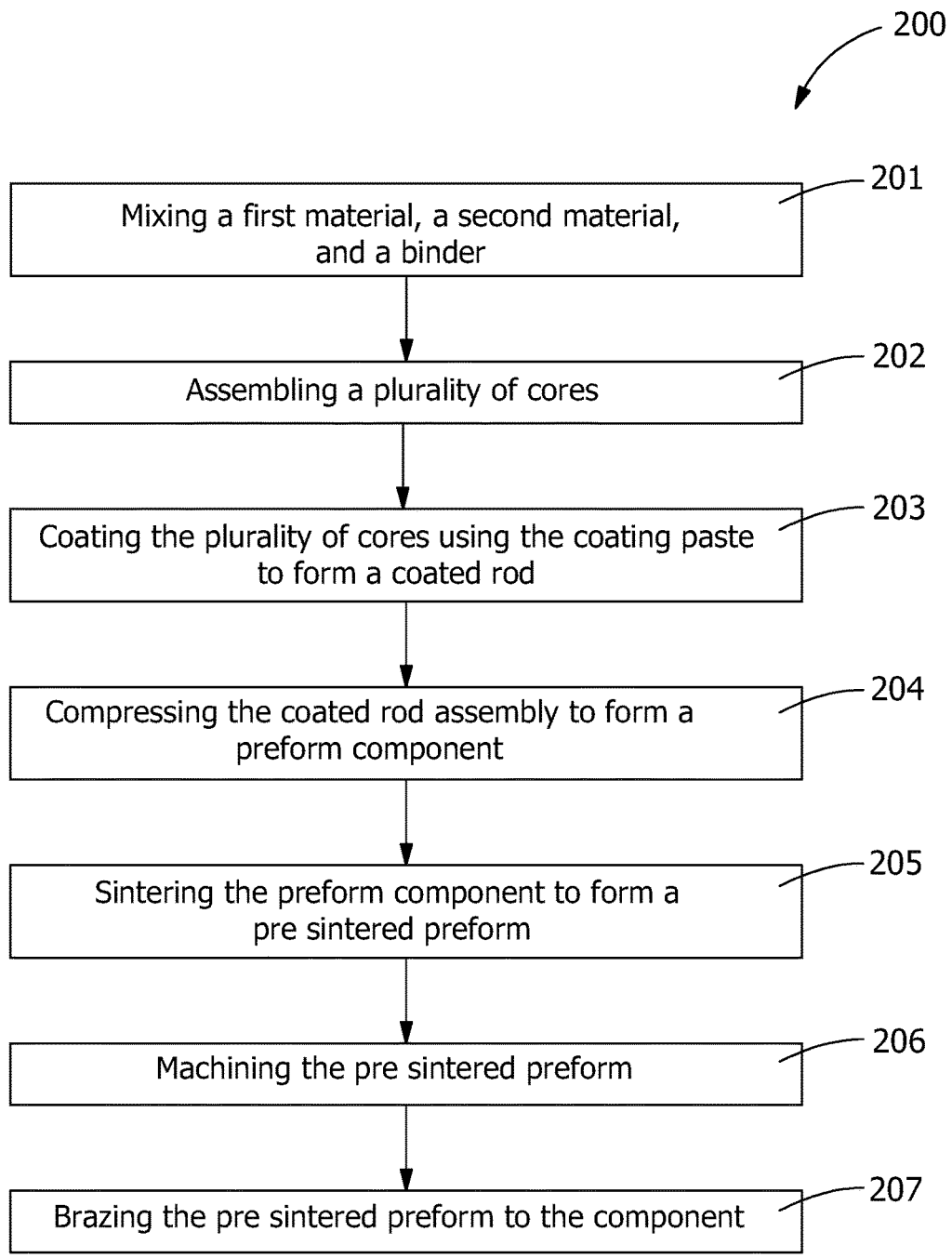
FIG. 23 shows a flow chart diagram illustrating an embodiment of a method, according to an exemplary embodiment of the present disclosure.

With reference to FIG. 23, a method 200 for treating a component is disclosed. The method 200 includes the step of mixing a first material having a first melting point, a second material having a second melting point, and a binder to make coating paste, wherein the first melting point is higher than the second melting point (step 201). The method 200 further includes the step of assembling a plurality of cores (step 202). The method further includes the step of coating the plurality of cores using the coating paste to form a coated rod assembly (step 203). The method further includes the step of compressing the coated rod assembly to envelop the coating paste to the plurality of cores and form a preform component having a near net shape (step 204). The method further includes the step of sintering the preform component to form a pre-sintered preform (step 205).

In one embodiment, the preform component has a cross-sectional geometry including a circle, an ellipse, an oval, a triangle, a rounded triangle, a square, a rounded square, a rectangle, a rounded rectangle, a pentagon, a rounded pentagon, a hexagon, a rounded hexagon, or a combination thereof.

In one embodiment, the method further includes the step of machining the pre-sintered preform to the required length and geometry (step 206). In one embodiment, the method further includes the step of brazing the pre-sintered preform in order to treat the component (step 207). In one embodiment, the method further includes the step of joining the plurality of cores. In one embodiment, a joining 103 includes resistance welding, tungsten inert gas tack welding, brazing, or a combination thereof. In one embodiment, the step of compressing may comprise extruding the coated rod assembly.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A hybrid preform component, comprising:
a plurality of elongated metallic cores, and
a coating paste enveloping the plurality of elongated metallic cores, the coating paste comprising a first material having a first melting point, a second material having a second melting point, and a binder, the first melting point being higher than the second melting point,
wherein the hybrid preform component has a compressed structure and near net shape, and
wherein the hybrid preform component is a pre-sintered preform.

2. The hybrid preform component of claim 1, wherein the coating paste has the first material in an amount, by weight, from about 35% to about 95% and the second material in an amount, by weight, from about 5% to about 65%.

3. The hybrid preform component of claim 1 has a cross sectional ratio of the plurality of elongated metallic cores to the coating paste from about 40% to about 90%.

4. The hybrid preform component of claim 1, wherein the hybrid preform component has a cross-sectional geometry selected from the group consisting of a circle, an ellipse, an oval, a triangle, a rounded triangle, a square, a rounded square, a rectangle, a rounded rectangle, a pentagon, a rounded pentagon, a hexagon, a rounded hexagon, and a combination thereof.

5. The hybrid preform component of claim 1, wherein the plurality of elongated metallic cores is selected from the group consisting of a superalloy; a nickel-based superalloy; a cobalt- based superalloy; an iron-based superalloy; a hard-to-weld (HTW) alloy; a refractory alloy; an ahoy including a composition by weight of about 14% chromium, about 9.5% cobalt, about 3.8% tungsten, about 4.9% titanium, about 3% aluminum, about 0.1% iron, about 2.8% tantalum, about .6% molybdenum, about 0.1% carbon, and a balance of nickel; an alloy including a composition by weight of about 7.5% cobalt, about 0.2% iron, about 9.75% chromium, about 4.2% aluminum, about 3.5% titanium, about 4.8% tantalum, about 6% tungsten, about 1.5% molybdenum, about 0.5% niobium, about 0.2% silicon, about 0.15; % hafnium, and a balance of nickel; an alloy including a composition by weight of about 22% chromium, about 22% nickel, about 0.1% carbon, about 3% iron, about 1.25% manganese, about 0.35% silicon, about 14% tungsten, about 0.03% lanthanum, and a balance of cobalt; an alloy including a composition by weight of about 0.17% carbon, about 16% chromium, about 8.5% cobalt, about 1.75% molybdenum, about 2.6% tungsten, about 3.4% titanium, about 3.4% aluminum, about 0.1% zirconium, about 2% niobium, and a balance of nickel; an alloy including a composition by weight of about 5.5% aluminum, about 0.15% carbon, about 8.25% chromium, about 10% cobalt, about 10% tungsten, about 0.7% molybdenum, about 0.5% iron, about 1% titanium, about 3% tantalum, about 1.5% hafnium, and a balance of nickel; an alloy including a composition by weight of about 8.4% chromium, about 9.5% cobalt, about 5.5% aluminum, about 0.7% titanium, about 9.5% tungsten, about 0.5% molybdenum, about 3% tantalum, about 1.5% hafnium, and a balance of nickel; an alloy including a composition by weight of about 6.8% chromium, about 12% cobalt, about 6.1% aluminum, about 4.9% tungsten, about 1.5;% molybdenum, about 2.8% rhenium, about 6.4% tantalum, about 1.5% hafnium, and a balance of nickel; an alloy including a composition by weight of about 7.6% chromium, about 3.1% cobalt, about 7.8% aluminum, about 5.5% tantalum, about 0.1% molybdenum, about 3.9% tungsten, about 1.7% rhenium, about 0.15% hafnium, and a balance of nickel; an alloy including a composition by weight of about 7.5% cobalt, about 13% chromium, about 6.6% aluminum, about 5% tantalum, about 3.8% tungsten, about 1.6% rhenium, about 0.15% hafnium, and a balance of nickel; and a combination thereof.

6. The hybrid preform component of claim 1, wherein the plurality of elongated metallic cores have the same diameter.

7. The hybrid preform component of claim 1, wherein the plurality of elongated metallic cores have unequal diameters.

8. The hybrid preform component of claim 1, wherein the plurality of elongated metallic cores are joined together independent of the coating paste.

9. The hybrid preform component of claim 1, wherein the plurality of elongated metallic cores are not joined together independent of the coating paste.

10. A method for treating a component, comprising:
    mixing a first material having a first melting point, a second material having a second melting point, and a binder to make coating paste, the first melting point being higher than the second melting point;
    assembling a plurality of cores;
    coating the plurality of cores using the coating paste to form a coated rod assembly;
    compressing the coated rod assembly to envelop the coating paste to the plurality of cores and form a preform component having a near net shape;
    sintering the preform component to form a pre-sintered preform.

11. The method of claim 10, wherein the preform component has a cross-sectional geometry selected from the group consisting of a circle, an ellipse, an oval, a triangle, a rounded triangle, a square, a rounded square, a rectangle, a rounded rectangle, a pentagon, a rounded pentagon, a hexagon, a rounded hexagon, and a combination thereof.

12. The method of claim 10, further comprising machining the pre-sintered preform to the required length and geometry.

13. The method of claim 10, further comprising brazing the pre-sintered preform to the component.

14. The method of claim 10, further comprising joining the plurality of cores.

15. The method of claim 14, wherein the joining is selected from the group consisting of resistance welding, tungsten inert gas tack welding, brazing, and a combination thereof.

16. The method of claim 10, wherein the compressing comprises extruding the coated rod assembly.

17. The method of claim 10, wherein the plurality of cores have the same diameter.

18. The method of claim 10, wherein the plurality of cores have unequal diameters.

19. The method of claim 10, wherein the plurality of cores are joined together prior to the coating of the plurality of cores using the coating paste.

20. The method of claim 10, wherein the plurality of cores are not joined together prior to the coating of the plurality of cores using the coating paste.

* * * * *